(12) United States Patent
Nagata (10) Patent No.: US 12,197,210 B2
(45) Date of Patent: Jan. 14, 2025

(54) SERVER, INFORMATION PROCESSING SYSTEM AND INFORMATION PROCESSING METHOD

(71) Applicant: TOYOTA JIDOSHA KABUSHIKI KAISHA, Toyota (JP)

(72) Inventor: Yu Nagata, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 17/899,996

(22) Filed: Aug. 31, 2022

(65) Prior Publication Data

US 2023/0129564 A1 Apr. 27, 2023

(30) Foreign Application Priority Data

Oct. 26, 2021 (JP) ................................ 2021-174733

(51) Int. Cl.
 *G05D 1/00* (2024.01)
 *G06F 8/65* (2018.01)

(52) U.S. Cl.
 CPC ......... *G05D 1/0038* (2013.01); *G05D 1/0027* (2013.01); *G05D 1/0282* (2013.01); *G06F 8/65* (2013.01)

(58) Field of Classification Search
 CPC .. G05D 1/0038; G05D 1/0027; G05D 1/0282; G06F 8/65
 See application file for complete search history.

(56) References Cited

U.S. PATENT DOCUMENTS

| 9,946,531 | B1* | 4/2018 | Fields | A61B 5/4064 |
|---|---|---|---|---|
| 10,776,096 | B2* | 9/2020 | Willis | H04L 67/34 |
| 10,981,578 | B2* | 4/2021 | Bai | G07C 5/0808 |
| 11,794,816 | B2* | 10/2023 | Iwasaki | G01C 21/34 |
| 2021/0362735 | A1* | 11/2021 | Nagao | H04L 9/3263 |
| 2023/0129564 | A1* | 4/2023 | Nagata | G05D 1/0282 |
| | | | | 701/2 |
| 2023/0146745 | A1* | 5/2023 | Herkel | B66B 5/027 |
| | | | | 187/316 |

FOREIGN PATENT DOCUMENTS

JP 2018-132979 A 8/2018

\* cited by examiner

*Primary Examiner* — Frederick M Brushaber
(74) *Attorney, Agent, or Firm* — Sughrue Mion, PLLC (57) ABSTRACT

A vehicle that is an automatic driving vehicle acquires a control program for an ECU from a control center by wireless communication. A server includes a keyboard and mouse to accept handling by a remote monitoring person that monitors the vehicle from the outside of the vehicle, a display to present information to the remote monitoring person, a communication IF configured to communicate with the vehicle, and a processor. The processor controls the display such that the server presents the change content of the control program to the remote monitoring person, when the control program for the vehicle has been updated. The processor controls the communication IF such that a notice of permission of traveling is given to the vehicle, when the keyboard and the mouse have accepted a remote monitoring person's handling for permitting the vehicle to travel in accordance with the control program after the update.

7 Claims, 10 Drawing Sheets

SERVER, INFORMATION PROCESSING SYSTEM AND INFORMATION PROCESSING METHOD

CROSS-REFERENCE TO RELATED APPLICATION

This application claims priority to Japanese Patent Application No. 2021-174733 filed on Oct. 26, 2021, incorporated herein by reference in its entirety.

BACKGROUND

1. Technical Field

The present disclosure relates to a server and an information processing method. More specifically, the present disclosure relates to a server that manages the operation of an automatic driving vehicle, an information processing system that includes the server, and an information processing method for managing information relevant to the operation of the automatic driving vehicle by the server.

2. Description of Related Art

Japanese Unexamined Patent Application Publication No. 2018-132979 (JP 2018-132979 A) discloses a software update system that manages the update of software for a control device that is mounted on a vehicle. The system updates the software by wireless communication (so-called over the air (OTA)).

SUMMARY

The inventors focused on the following problem that can occur after the update of the control program for the control device mounted on the vehicle. In a conventional vehicle, a driver is in a vehicle cabin, and therefore the driver can check how the control program has been changed, before determining whether to start the traveling of the vehicle. Meanwhile, an automatic driving vehicle can be monitored from outside of the automatic driving vehicle. That is, in the automatic driving vehicle, the driver is not always in the vehicle cabin. Accordingly, there can be a problem of the way to determine whether to start the traveling of the vehicle after the update of the control program. Such a situation is not discussed in JP 2018-132979 A at all.

The present disclosure has been made for solving the above problem, and an object of the present disclosure is to appropriately start the traveling of the automatic driving vehicle after the update of the control program for the control device mounted on the automatic driving vehicle.

(1) A server according to an aspect of the present disclosure monitors an automatic driving vehicle. The automatic driving vehicle is configured to acquire a control program from a control center by wireless communication, the control program being a control program for a control device that is mounted on the automatic driving vehicle. The server includes: an input device configured to accept handling by a remote monitoring person that monitors the automatic driving vehicle from outside of the automatic driving vehicle; an output device configured to present information to the remote monitoring person; a communication device configured to be capable of communicating with the automatic driving vehicle; and a processor configured to control the input device, the output device and the communication device. The processor controls the output device such that the server presents a change content of the control program to the remote monitoring person, when the control program for the automatic driving vehicle has been updated. The processor controls the communication device such that a notice of permission of traveling is given to the automatic driving vehicle, when the input device has accepted a remote monitoring person's handling for permitting the automatic driving vehicle to travel in accordance with the control program after the update.

(2) The processor may control the output device such that a function of the automatic driving vehicle before the update of the control program and a function of the automatic driving vehicle after the update of the control program are presented to the remote monitoring person in a comparable manner.

(3) The processor may control the output device such that the change content relevant to information that is used when the remote monitoring person monitors the automatic driving vehicle is presented to the remote monitoring person.

(4) The server may manage operation of a plurality of vehicles on each of which a plurality of control devices is mounted. The change content may include information for identifying a vehicle for which the control program has been updated, from the plurality of vehicles, and may include a condition for identifying a control device for which the control program has been updated, from the plurality of control devices mounted on the vehicle.

(5) An information processing system according to another aspect of the present disclosure includes: the above server; and the automatic driving vehicle.

(6) The automatic driving vehicle may start the traveling after receiving the notice of permission of traveling from the server.

(7) An information processing method according to another aspect of the present disclosure is a method in which a server monitors an automatic driving vehicle. The automatic driving vehicle is configured to acquire a control program from a control center by wireless communication, the control program being a control program for a control device that is mounted on the automatic driving vehicle. The information processing method includes a first step and a second step. The first step is a step of presenting, by the server, a change content of the control program to a remote monitoring person, when the control program for the automatic driving vehicle has been updated, the remote monitoring person monitoring the automatic driving vehicle from outside of the automatic driving vehicle. The second step is a step of giving a notice of permission of traveling to the automatic driving vehicle, when the remote monitoring person has performed handling for permitting the automatic driving vehicle to travel in accordance with the control program after the update.

With the present disclosure, it is possible to appropriately start the traveling of the automatic driving vehicle after the update of the control program for the control device that is mounted on the automatic driving vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described below in detail with reference to the drawing. In the figures, identical or corresponding portions are denoted by identical reference characters, and descriptions therefor are not repeated.

Embodiment

Schematic Configuration of Information Processing System

Figure 1:
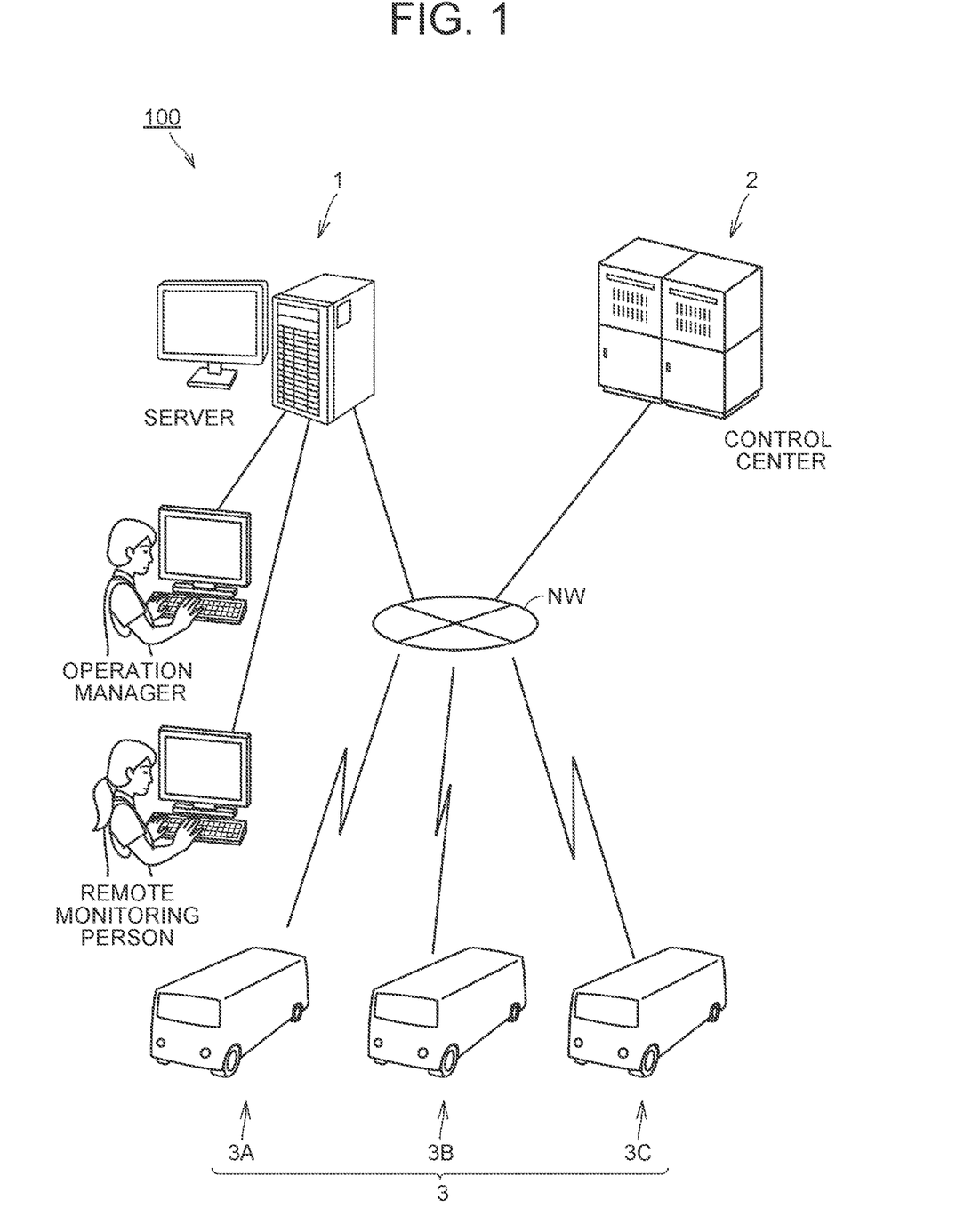
FIG. 1 is a diagram showing a schematic configuration of an information processing system according to an embodiment.

FIG. 1 is a diagram showing a schematic configuration of an information processing system according to an embodiment. An information processing system 100 includes a server 1, a control center 2, and a plurality of vehicles 3A, 3B, 3C. In the following, for convenience of description, an arbitrary vehicle of the vehicles 3A, 3B, 3C is referred to as a vehicle 3. In FIG. 1, three vehicles 3 are shown, but the number of vehicles 3 is an arbitrary value.

For example, the server 1 is a server possessed by a business operator (a bus business operator, a taxi business operator, a ride-sharing service business operator, or the like) that manages the operation of the vehicle 3. The server 1 may be a shared server possessed by a plurality of business operators that includes the business operator. The server 1 may be a cloud server provided by a cloud server management company.

The server 1 is used not only by an operation manager of the vehicle 3 but also by a remote monitoring person of the vehicle 3. For example, the operation manager is a staff (so-called superior manager) that works at a business organizer to manage the operation of the vehicle 3 and that has the authority to update a control program for the vehicle 3. The remote monitoring person is a staff (so-called operator) that remotely monitors the vehicle 3 and that performs the handling of the vehicle 3 when appropriate. The operation manager and the remote monitoring person are generally different persons, but may be the same person. In this example, description will be made assuming that the operation manager and the remote monitoring person are different persons.

The control center 2 is a server of a business operator (for example, a vehicle manufacture) that provides a control program for an electronic control unit (ECU) 31 (see FIG. 2) that is mounted on the vehicle 3.

Each vehicle 3 is an automatic driving vehicle. Each vehicle 3 is used in a service that is provided by the above business operator. The kind (vehicle type) of the vehicle 3 is selected when appropriate, depending on the service that is provided by the business operator. In this example, the vehicle 3 is a bus. The server 1, the control center 2 and each vehicle 3 are connected so as to be capable of communicating with each other through a wired or wireless network NW.

Hardware Configuration of Vehicle

Figure 2:
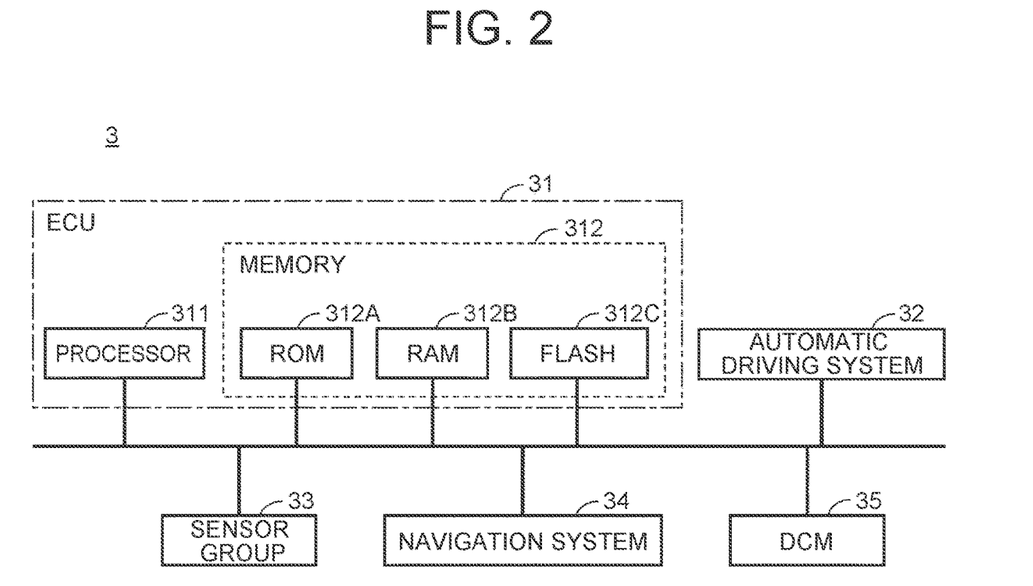
FIG. 2 is a block diagram showing a typical hardware configuration of a vehicle.

FIG. 2 is a block diagram showing a typical hardware configuration of the vehicle 3. The vehicle 3 includes an ECU 31, an automatic driving system 32, a sensor group 33, a navigation system 34 and a data communication module (DCM) 35. The ECU 31, the automatic driving system 32, the sensor group 33, the navigation system 34 and the DCM 35 are connected with each other by a wired in-vehicle network such as a controller area network (CAN) and Ethernet (R).

The ECU 31 includes a processor 311 and a memory 312. The memory 312 includes a read only memory (ROM) 312A, a random access memory (RAM) 312B and a flash memory 312C. The processor 311 controls the whole action of the vehicle 3 by executing the control program. The memory 312 stores software that is executed by the processor 311. Particularly, the flash memory 312C stores the control program that is updated by OTA. The flash memory 312C may be another rewritable non-volatile memory.

The ECU 31 controls apparatuses such that the vehicle 3 is in a desired state, in response to signals from the sensor group 33 and the like. The ECU 31 outputs commands for controlling various systems, in coordination with the automatic driving system 32. Although not illustrated, the various systems can include a brake system, a steering system, a power train system (for example, an electric parking brake system, a parking lock system, a shift device and a motor generator), a body system (for example, a direction indicator, a horn and a wiper), and the like.

The ECU 31 sends a variety of information indicating the state of the vehicle 3, to the server 1 and sends a variety of requests to the server 1, through the DCM 35. Further, the ECU 31 receives commands or notices from the server 1 through the DCM 35. In addition, in the embodiment, the ECU 31 receives (downloads) the control program from the control center 2 through the DCM 35, and installs the downloaded control program in the memory 312 at an appropriate timing. Then, the ECU 31 activates the installed control program at an appropriate timing. The ECU 31 may be divided into a plurality of ECUs according to functions. In a later-described example (see FIG. 8), the ECU 31 includes a camera ECU.

The automatic driving system 32 is configured such that the automatic driving of the vehicle 3 can be realized. The automatic driving is such a control that the action of the vehicle 3 is executed without the driving handling by a driver of the vehicle 3 (unmanned driving). In this example, the automatic driving system 32 is configured such that the fully automatic driving of the vehicle 3 can be performed. However, the automatic driving may include a control to assist the driving handling by the driver of the vehicle 3 at the time of the action of the vehicle 3, as exemplified by acceleration, deceleration and steering (manned driving). The automatic driving system 32 may be a part of the ECU 31.

The sensor group 33 includes sensors (not illustrated) configured to detect the external situation of the vehicle 3, and includes sensors (not illustrated) configured to detect information corresponding to the traveling state of the vehicle 3, a steering handling, an accelerator handling and a brake handling. Specifically, for example, the sensor group 33 includes a camera, a radar, a laser imaging detection and ranging (LIDAR), a vehicle speed sensor, an acceleration sensor, and a yaw rate sensor.

The navigation system 34 includes a global positioning system (GPS) receiver (not illustrated). The GPS receiver identifies the position of the vehicle 3 based on electric waves from artificial satellites (not illustrated). The navigation system 34 executes a navigation process for the vehicle 3, using the position information about the vehicle 3 that is identified by the GPS receiver.

The DCM 35 is an in-vehicle communication module. The DCM 35 is configured to allow bidirectional data communication between the ECU 31 and the server 1, and to allow bidirectional data communication between the ECU 31 and the control center 2.

Hardware Configuration of Server

Figure 3:
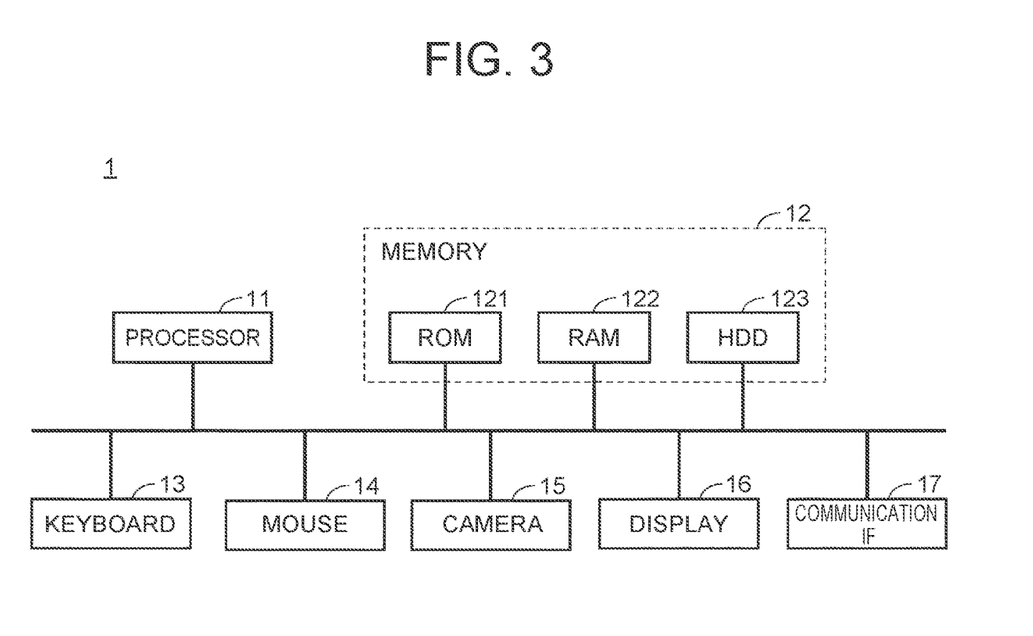
FIG. 3 is a block diagram showing a typical hardware configuration of a server.

FIG. 3 is a block diagram showing a typical hardware configuration of the server 1. The server 1 includes a processor 11, a memory 12, a keyboard 13, a mouse 14, a camera 15, a display 16, and a communication interface (IF) 17. The memory 12 includes a ROM 121, a RAM 122 and a hard disk drive (HDD) 123. The processor 11, the memory 12, the keyboard 13, the mouse 14, the camera 15, the display 16 and the communication IF 17 are connected with each other by a bus.

The processor 11 controls the whole action of the server 1. The memory 12 stores an operating system and application programs that are executed by the processor 11. The keyboard 13 and the mouse 14 accept inputs by a user. The camera 15 photographs a handling person of the server 1. In the embodiment, the handling person of the server 1 is the operation manager or remote monitoring person of the vehicle 3. The display 16 displays a variety of information to the handling person of the server 1. The communication IF 17 is configured to allow communication between the control center 2 and each vehicle 3.

At least one of the keyboard 13 and the mouse 14 corresponds to the "input device" according to the present disclosure. The "input device" may be a dedicated handling terminal for vehicle operation management, a touch panel, a microphone or the like. At least one of the display 16 and the communication IF 17 corresponds to the "output device" according to the present disclosure. The "output device" may be a speaker, for example. At least one of the keyboard 13, the mouse 14 and the camera 15 corresponds to the "authentication device" according to the present disclosure.

Traveling After Update of Control Program

In a conventional manned driving vehicle, a driver is in a vehicle cabin, and therefore the driver can check how the control program has been changed, before determining whether to start the traveling of the vehicle. Meanwhile, the vehicle 3 that is an automatic driving vehicle is monitored from outside of the vehicle 3, and no driver is in the vehicle cabin. Accordingly, there can be a problem of the way to determine whether to start the traveling of the vehicle 3 after the update of the control program.

In the embodiment, after the update of the control program, the server 1 (processor 11) displays the change content of the control program on the display 16. Then, in the case where the remote monitoring person has performed, to the keyboard 13 or mouse 14, handling for permitting the traveling of the vehicle 3 for which the control program has been updated, the server 1 gives a notice of permission of traveling to the vehicle 3. The vehicle 3 starts the traveling after receiving the notice of permission of traveling from the server 1. Thereby, even when no person is in the vehicle 3, it is possible to appropriately start the traveling of the vehicle 3 after the update of the control program.

Functional Configuration of Server

Figure 4:
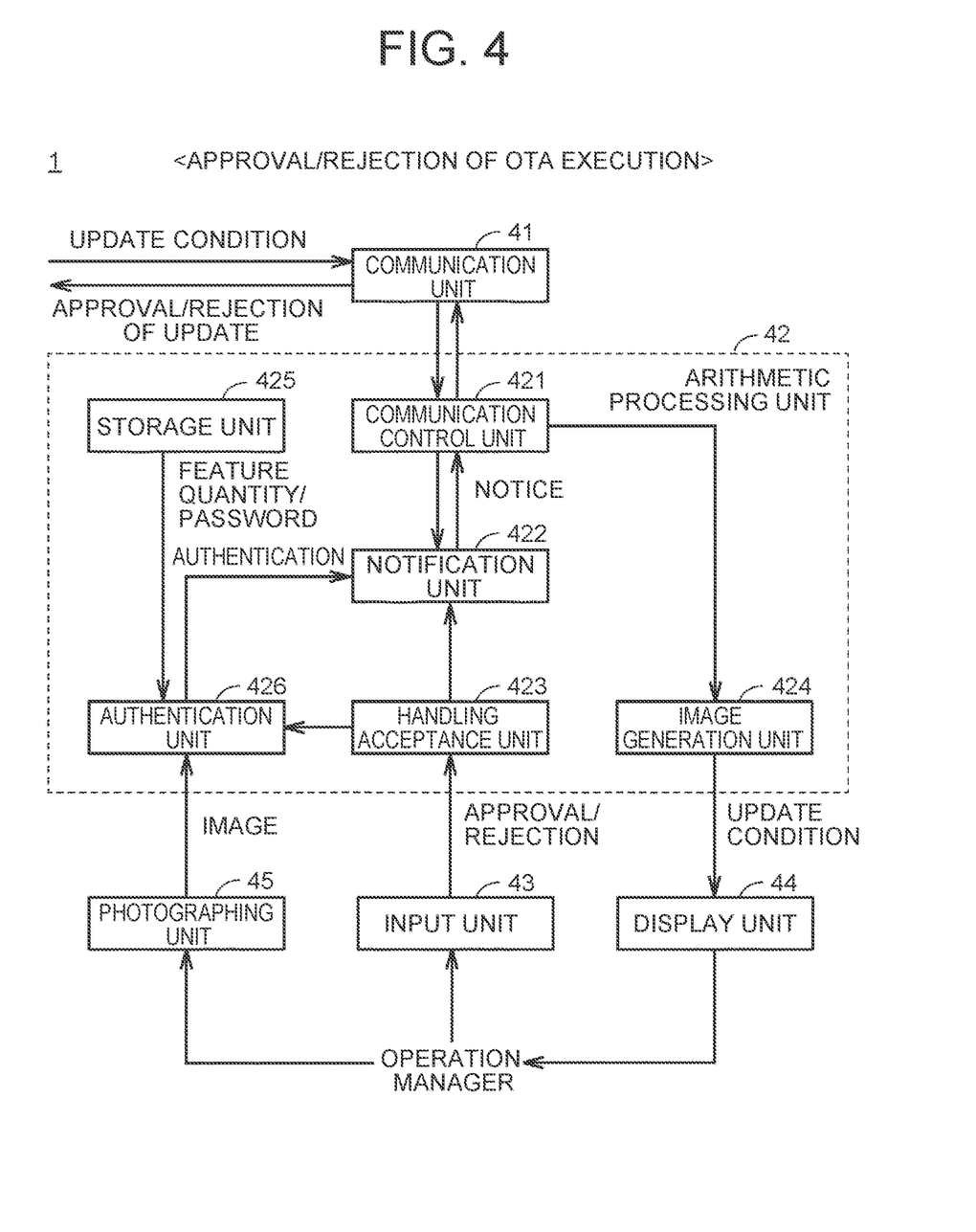
FIG. 4 is a functional block diagram showing a functional configuration of the server that is relevant to the update of a control program.

FIG. 4 is a functional block diagram showing a functional configuration of the server 1 that is relevant to the update of the control program. The server 1 includes a communication unit 41, an arithmetic processing unit 42, an input unit 43, a display unit 44 and a photographing unit 45. The arithmetic processing unit 42 is a functional block that is realized when the processor 11 executes the operating system and application programs stored in the memory 12. The arithmetic processing unit 42 includes a communication control unit 421, a notification unit 422, a handling acceptance unit 423, an image generation unit 424, a storage unit 425 and an authentication unit 426.

The communication unit 41 communicates with the outside (the control center 2 and/or the vehicle 3). More specifically, the communication unit 41 receives the update condition of the control program for the ECU 31 of the vehicle 3, from the outside. Details of the update condition will be described later. Further, to the outside, the communication unit 41 sends a notice indicating whether the operation manager of the vehicle 3 that has checked the update condition of the control program agrees to the update of the control program (approval/rejection). The communication unit 41 corresponds to the communication IF 17 in FIG. 3.

The communication control unit 421 controls the communication with the outside through the communication unit 41. The communication control unit 421 outputs the update condition of the control program that is received by the communication unit 41, to the image generation unit 424, and sends a notice that is generated by the notification unit 422, from the communication unit 41 to the outside.

The handling acceptance unit 423 outputs an input handling to the input unit 43 by the operation manager of the vehicle 3, to the notification unit 422 or the authentication unit 426. More specifically, the handling acceptance unit 423 outputs, to the notification unit 422, a result (a result of handling to a YES button or NO button in a later-described example) of the selection by the operation manager about whether to agree to the update of the control program. In addition, the handling acceptance unit 423 can output a password input by the operation manager, to the authentication unit 426. The input unit 43 corresponds to the keyboard 13 or the mouse 14 in FIG. 3.

The image generation unit 424 generates an image indicating the update condition of the control program that is received by the communication control unit 421. Further, the image generation unit 424 generates an image on which the operation manager having checked the update condition selects whether to agree to the update of the control program. The display unit 44 displays the image generated by the image generation unit 424, to the operation manager. The display unit 44 corresponds to the display 16 in FIG. 3.

The photographing unit 45 photographs the operation manager of the vehicle 3, and outputs the photographed image to the authentication unit 426. The photographing unit 45 corresponds to the camera 15 in FIG. 3.

The storage unit 425 stores data for authenticating the operation manager of the vehicle 3. The technique for authenticating the operation manager is not particularly limited, and various known techniques can be employed. In this example, the storage unit 425 stores the feature quantity for face authentication of the operation manager. The storage unit 425 may store data for another biometric authentication (fingerprint authentication, iris authentication, voice authentication or the like). The storage unit 425 may store the password set by the operation manager.

The authentication unit 426 authenticates the operation manager based on the image photographed by the photographing unit 45 and the feature quantity stored in the storage unit 425. The authentication unit 426 may authenticate the operation manager based on the password input to the input unit 43 and the password stored in the storage unit 425. The authentication unit 426 outputs an authentication result to the notification unit 422.

In the case where the authentication unit 426 recognizes that the server 1 is being handled by an authorized operation manager registered in advance, the notification unit 422 generates a notice indicating whether the operation manager agrees to the update of the control program. More specifically, in the case where the operation manager has performed handling for agreeing to the update of the control program (in the case where the YES button has been pressed), the notification unit 422 generates an update approval notice for the control program. On the other hand, in the case where the operation manager has performed handling for rejecting the update of the control program (in the case where the NO button has been pressed), the notification unit 422 generates an update rejection notice for the control program. The notice generated by the notification unit 422 is output to the communication control unit 421, and is sent from the communication unit 41 to the outside.

Figure 5:
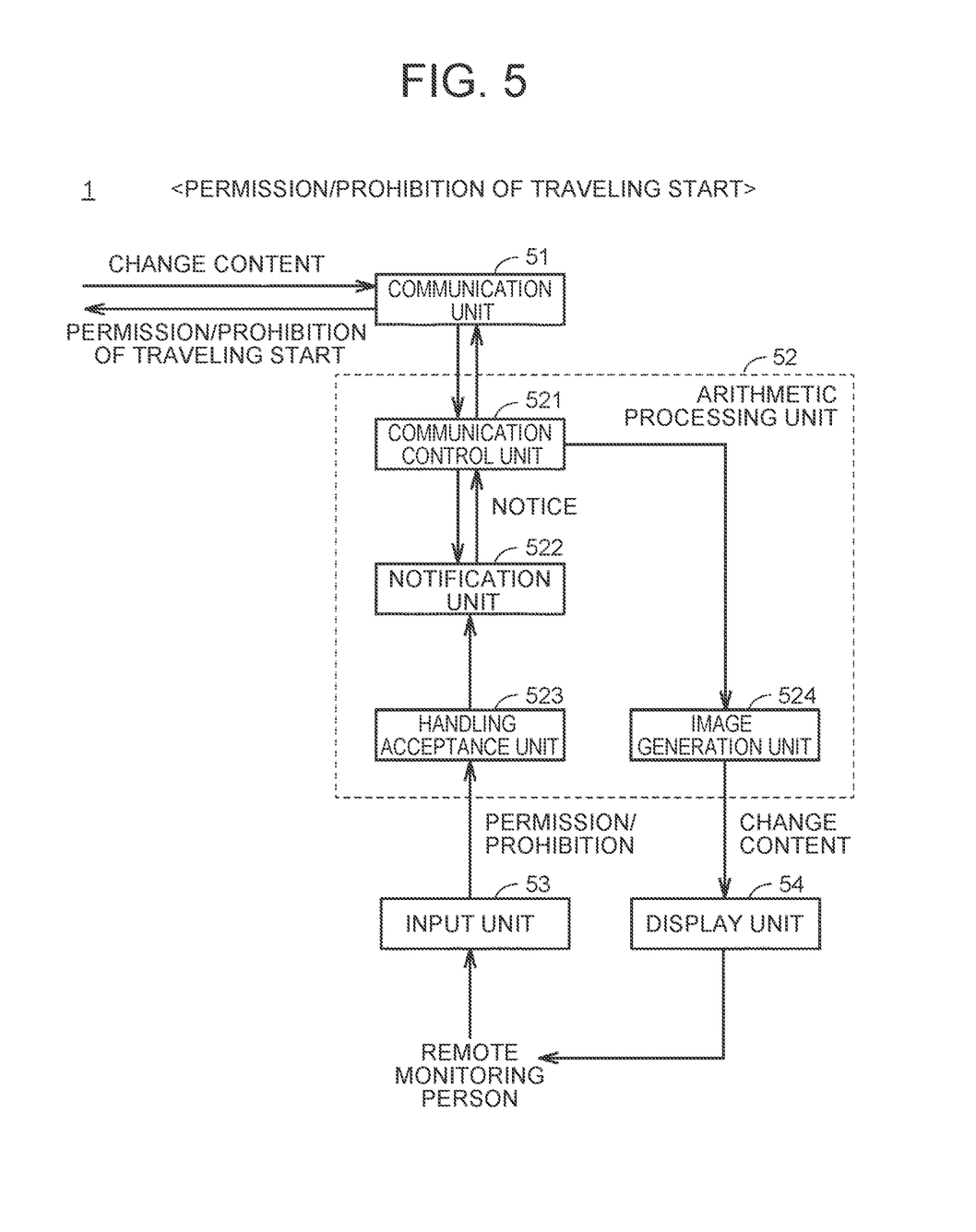
FIG. 5 is a functional block diagram showing a functional configuration of the server that is relevant to start of traveling after the update of the control program.

FIG. 5 is a functional block diagram showing a functional configuration of the server 1 that is relevant to the start of the traveling after the update of the control program. The server 1 includes a communication unit 51, an arithmetic processing unit 52, an input unit 53 and a display unit 54. Similarly to the arithmetic processing unit 42, the arithmetic processing unit 52 is a functional block that is realized when the processor 11 executes the operating system and application programs stored in the memory 12. The arithmetic processing unit 52 includes a communication control unit 521, a notification unit 522, a handling acceptance unit 523 and an image generation unit 524.

The communication unit 51 communicates with the outside. The communication unit 51 receives the change content of the control program, from the outside. Details of the change content will be described later. Further, to the outside, the communication unit 41 sends a notice indicating whether the remote monitoring person of the vehicle 3 that has checked the change content of the control program agrees to the driving start (driving restart) of the vehicle 3 (permission/prohibition). The communication unit 51 corresponds to the communication IF 17 in FIG. 3.

The communication control unit 521 controls the communication with the outside through the communication unit 51. The communication control unit 521 outputs the change content of the control program that is received by the communication unit 51, to the image generation unit 524, and sends a notice that is generated by the notification unit 522, from the communication unit 51 to the outside.

The handling acceptance unit 523 outputs an input handling to the input unit 53 by the remote monitoring person of the vehicle 3, to the notification unit 522. More specifically, the handling acceptance unit 523 outputs, to the notification unit 522, a result (a result of handling to a YES button or NO button) of the selection by the remote monitoring person about whether to agree to the start of the traveling of the vehicle 3.

The image generation unit 524 generates an image indicating the change content of the control program that is received by the communication control unit 521. Further, the image generation unit 524 generates an image on which the remote monitoring person having checked the change content selects whether to agree to the start of the traveling of the vehicle 3 after the update of the control program. The display unit 54 displays the image generated by the image generation unit 524, to the remote monitoring person. The display unit 54 corresponds to the display 16 in FIG. 3.

The notification unit 522 generates a notice indicating whether the remote monitoring person agrees to the start of the traveling of the vehicle 3. More specifically, in the case where the remote monitoring person has performed handling for agreeing to the start of the traveling of the vehicle 3 (in the case where the YES button has been pressed), the notification unit 522 generates a permission notice for the start of the traveling of the vehicle 3. On the other hand, in the case where the remote monitoring person has performed handling for rejecting the start of the traveling of the vehicle 3 (in the case where the NO button has been pressed), the notification unit 522 generates a prohibition notice for the start of the traveling of the vehicle 3. The notice generated by the notification unit 522 is output to the communication control unit 521, and is sent from the communication unit 51 to the outside.

Processing Flow

Figure 6:
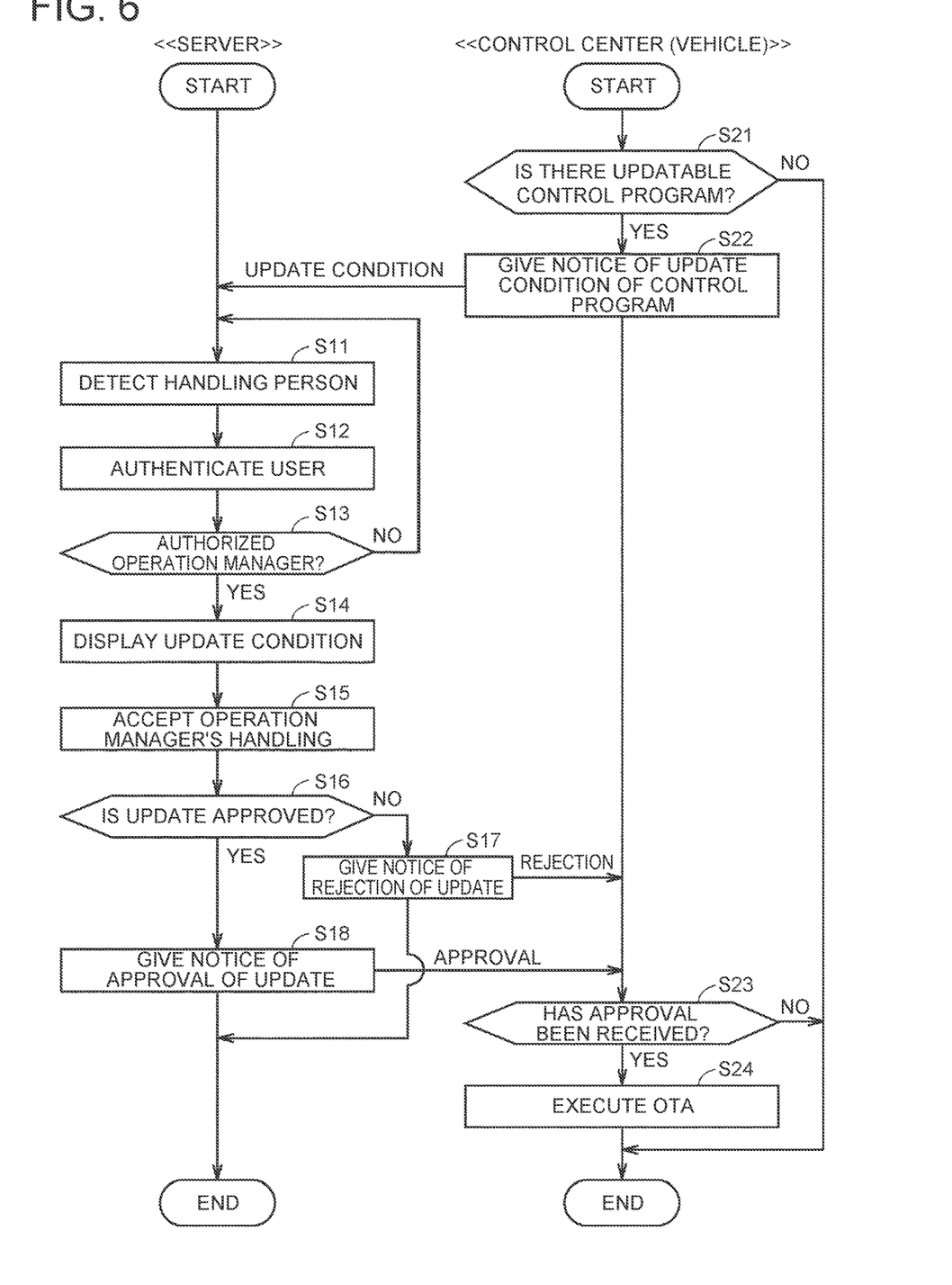
FIG. 6 is a first flowchart for describing a flow of a process that is executed in the information processing system.

FIG. 6 is a first flowchart for describing a flow of a process that is executed in the information processing system 100. Flowcharts shown in FIG. 6 and FIG. 9 described later are executed at a preset time interval, for example. A process that is executed by the server 1 is shown on the left side, and a process that is executed by the control center 2 is shown on the right side. The process on the right side may be executed by the vehicle 3. This is because the control center 2 and the vehicle 3 can communicates with each other and therefore a notice from the server 1 can reach the vehicle 3 through the control center 2 and can reach the control center 2 through the vehicle 3. Each step is realized by software processing, but may be realized by hardware (electric circuits). Hereinafter, "step" is referred to as "S".

In S21, the control center 2 determines whether there is an updatable control program for the ECU 31 of the vehicle 3. In the case where there is an updatable control program (YES in S21), the control center 2 gives a notice indicating that there is an updatable control program, to the server 1. On this occasion, the control center 2 further gives a notice of the update condition (described later) of the control program, to the server 1 (S22).

When the server 1 receives the notice from the control center 2, the server 1 detects the handling person of the server 1, using the camera 15, for example (S11). Then, the server 1 authenticates whether the handling person of the server 1 is an authorized operation manager registered in advance (S12). In the case where the handling person of the server 1 is authenticated (YES in S13), the server 1 displays the update condition of the control program on the display 16 (S14). The server 1 makes an inquiry to the operation manager about whether to permit the update of the control program. Then, the server 1 accepts the operation manager's handling relevant to whether to permit the update of the control program (S15).

Figure 7:
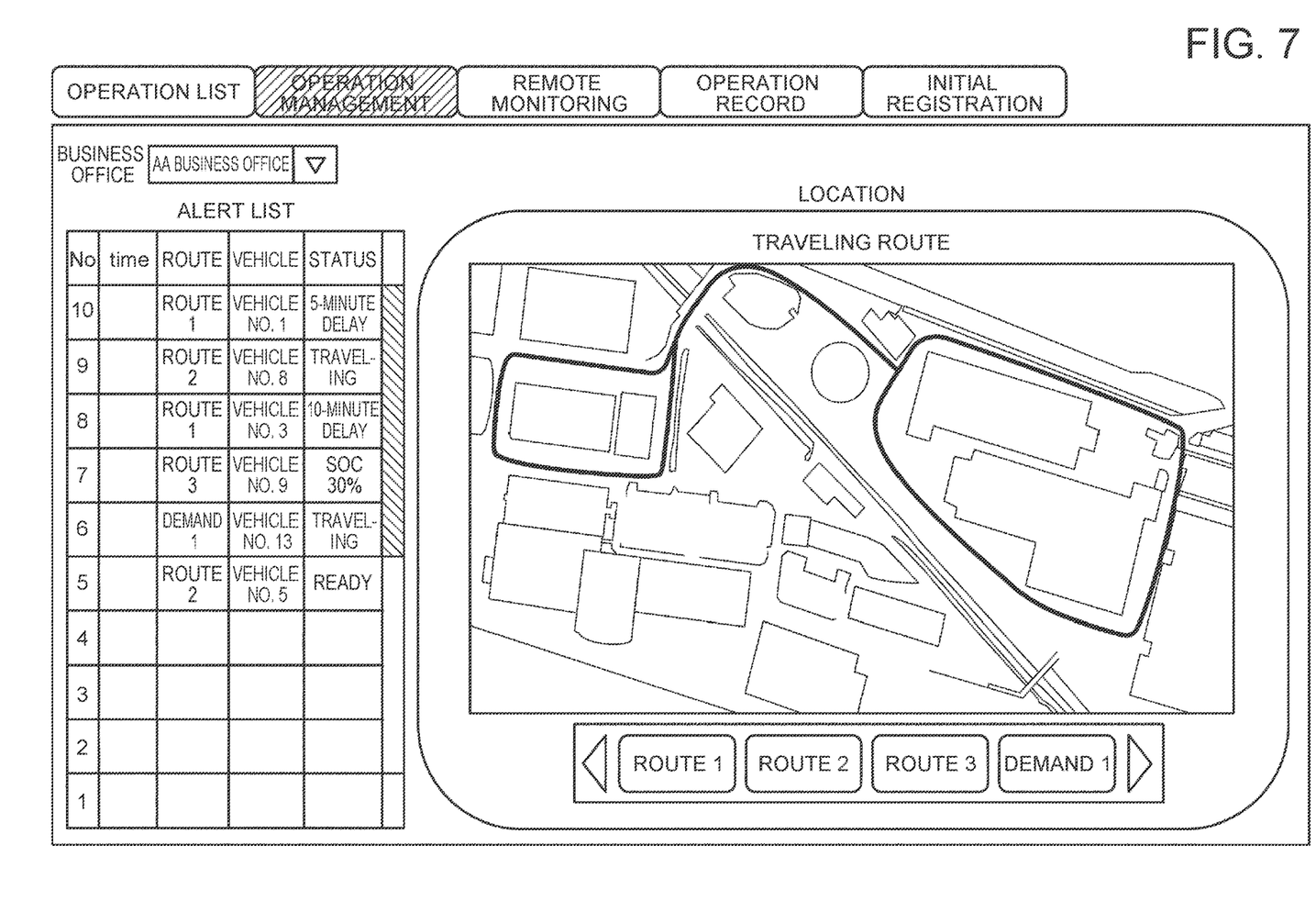
FIG. 7 is a diagram showing an example of an image that is displayed on a display before an inquiry to an operation manager about whether to permit the update of the control program.

FIG. 7 is a diagram showing an example of an image that is displayed on the display 16 before the inquiry to the operation manager about whether to permit the update of the control program. Before the inquiry to the operation manager, each traveling situation of the plurality of vehicles 3 (buses in this example) that is managed by the server 1 is displayed on an operation management screen of the display 16. More specifically, time, the traveling route name of the vehicle 3, the identification number of the vehicle 3, and the status (the delay from a time prescribed on a timetable, the decrease in state of charge (SOC), and the like) of the vehicle 3 are displayed. Further, a map showing the current place of each vehicle 3 on the traveling route is displayed on the display 16.

Figure 8:
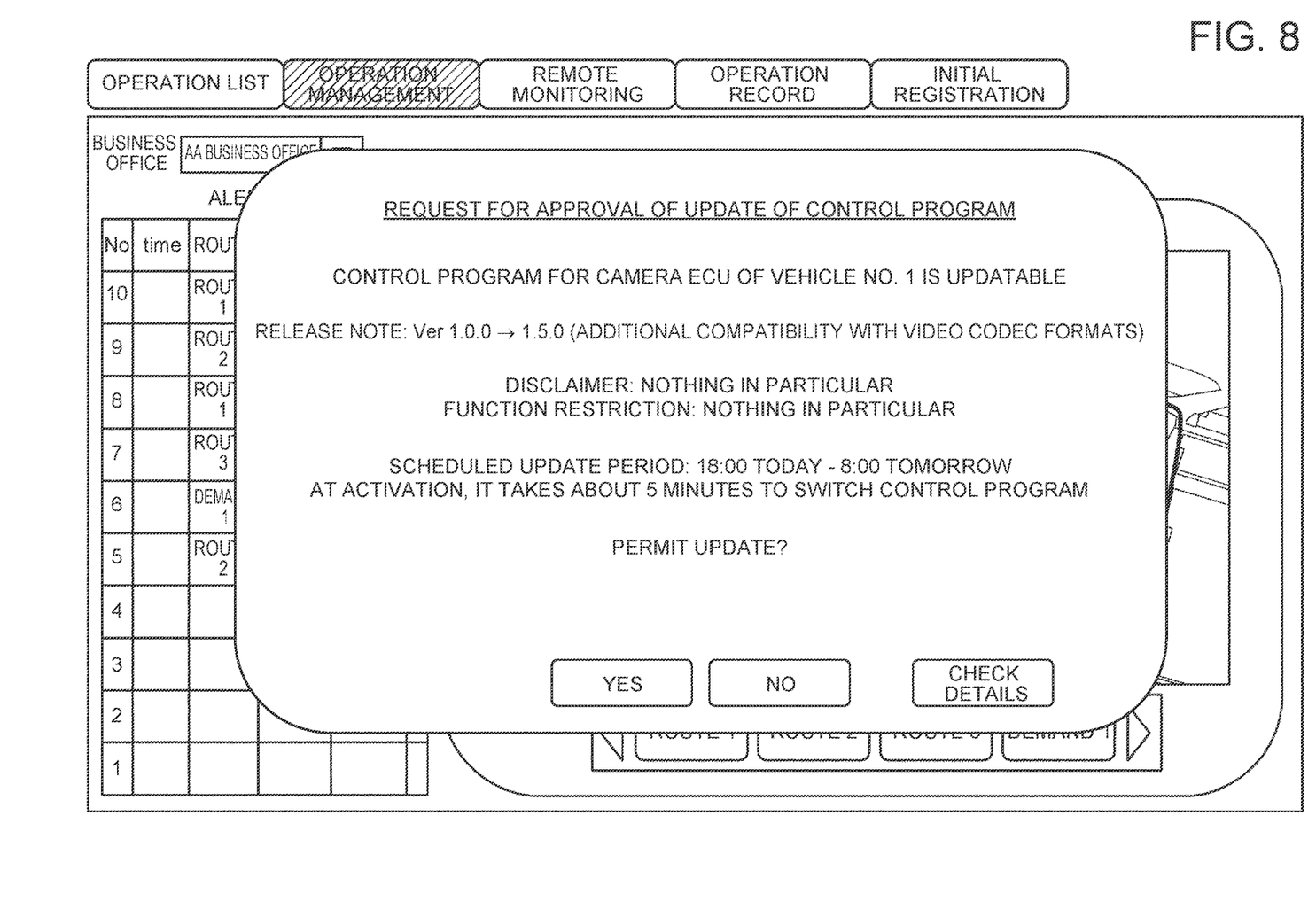
FIG. 8 is a diagram showing an example of an image that is displayed on the display at the time of the inquiry to the operation manager about whether to permit the update of the control program.

FIG. 8 is a diagram showing an example of an image that is displayed on the display 16 at the time of the inquiry to the operation manager about whether to permit the update of the control program. At the time of the inquiry to the operation manager, a dialog box is displayed on the screen shown in FIG. 7. In the dialog box, for example, information identifying the targeted vehicle 3 (vehicle No. 1 in this example), information identifying the targeted ECU (camera ECU), a brief description (additional compatibility with video codec formats) about the update content of the control program, a disclaimer (nothing in particular) when the updated control program includes a bug, and a function restriction (nothing in particular) due to the update of the control program are displayed. In addition, in the dialog box, for example, a scheduled update period (18:00 today to 8:00 tomorrow) for the control program and a required update time (about 5 minutes) for the control program are displayed.

The server 1 displays the above update condition, and then makes the inquiry about whether the operation manager of the vehicle 3 approves the update of the control program. In this example, in the case where the operation manager clicks a "YES" button, the update of the control program is approved (permitted). On the other hand, in the case where the operation manager clicks a "NO" button, the update of the control program is rejected (prohibited). By clicking a "CHECK DETAILS" button, the operation manager can check a more detailed content of each update condition before determining the approval or rejection of the update.

Back to FIG. 6, in the case where the operation manager has performed the handling for approving the update of the control program (YES in S16), the server 1 gives the notice of the approval of the update of the control program, to the control center 2 (S18). When the control center 2 receives the notice of the approval of the update (YES in S23), in the case where a condition appropriate to the update of the control program has been satisfied (for example, in the case where the vehicle 3 having provided a service has returned to a garage and has parked), the control center 2 executes the update (OTA) of the control program in coordination with the vehicle 3 (S24). That is, the control program is downloaded from the control center 2 to the vehicle 3, and is installed in the flash memory 312C of the ECU 31.

On the other hand, in the case where the operation manager has performed the handling for rejecting the update of the control program (NO in step S16), the server 1 gives the notice of the rejection of the update of the control program, to the control center 2 (S17). In the case where the control center 2 has received the notice of the rejection of the update (NO in S23), the control center 2 does not execute the update (OTA) of the control program. Although not illustrated, also in the case where the handling for approving the update of the control program has not been performed in time, the control center 2 does not execute the update of the control program.

Figure 9:
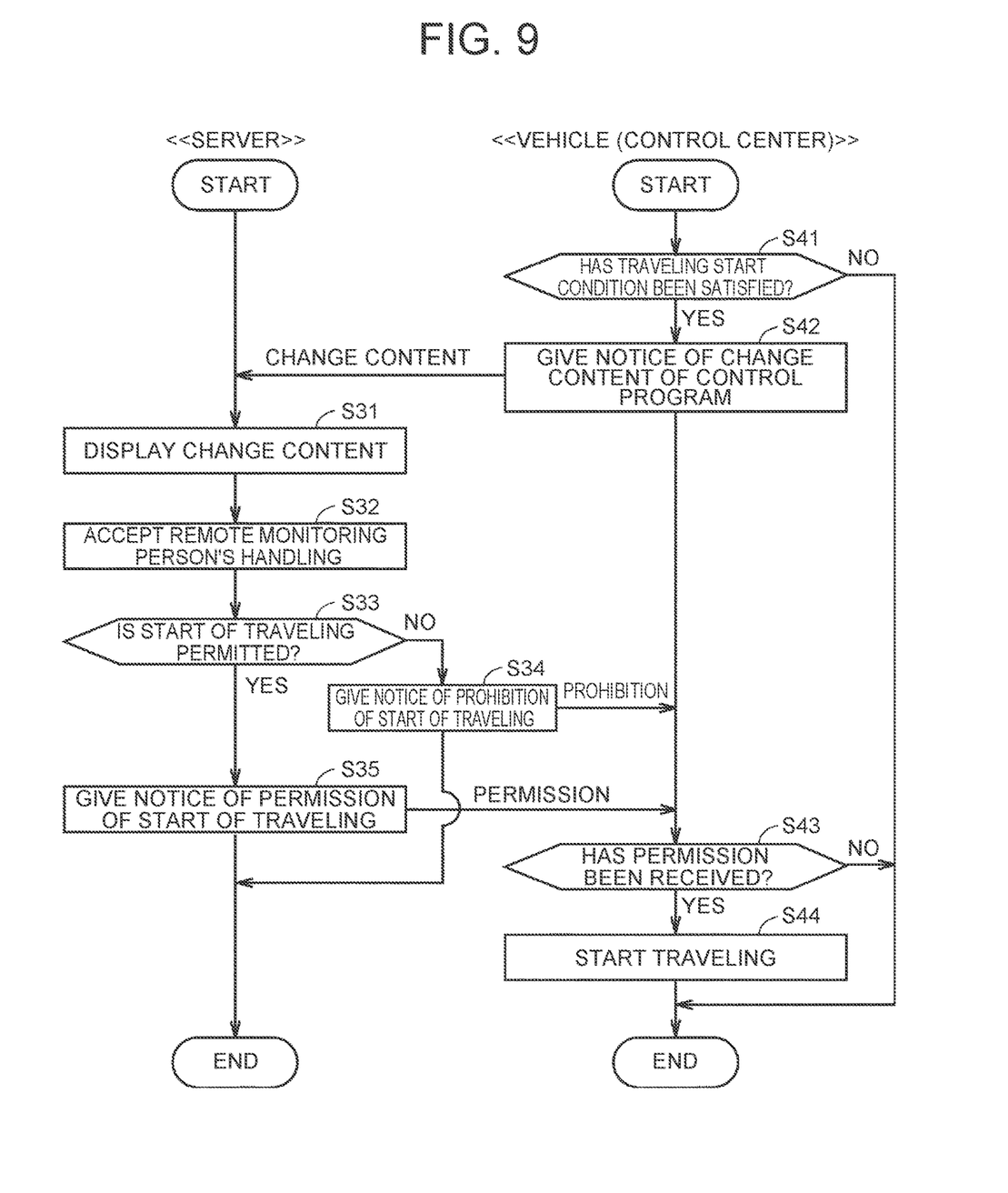
FIG. 9 is a second flowchart for describing a flow of a process that is executed in the information processing system.

FIG. 9 is a second flowchart for describing a flow of a process that is executed in the information processing system 100. A process that is executed by the server 1 is shown on the left side, and a process that is executed by the vehicle 3 is shown on the right side. A part of the process on the right side may be executed by the control center 2. The processes are executed after the control program is updated in accordance with the first flowchart shown in FIG. 6.

In S41, the vehicle 3 determines whether a traveling start condition for the vehicle 3 has been satisfied. For example, in the case where the current time is near an operation start time about the vehicle 3 that parks at the garage after the update of the control program, the vehicle 3 determines that the traveling start condition for the vehicle 3 has been satisfied. In the case where the traveling start condition for the vehicle 3 has been satisfied (YES in S41), the vehicle 3 gives the notice of the change content of the control program, to the server 1 (S42). This notice is given to the remote monitoring person that is different from the operation manager.

The server 1 receives the notice from the vehicle 3, and then displays the change content of the control program on the display 16 (S31). The server 1 makes the inquiry to the remote monitoring person about whether to permit the start of the traveling of the vehicle 3 after the update of the control program. Then, the server 1 accepts the remote monitoring person's handling relevant to whether to permit the start of the traveling of the vehicle 3 (S32).

Figure 10:
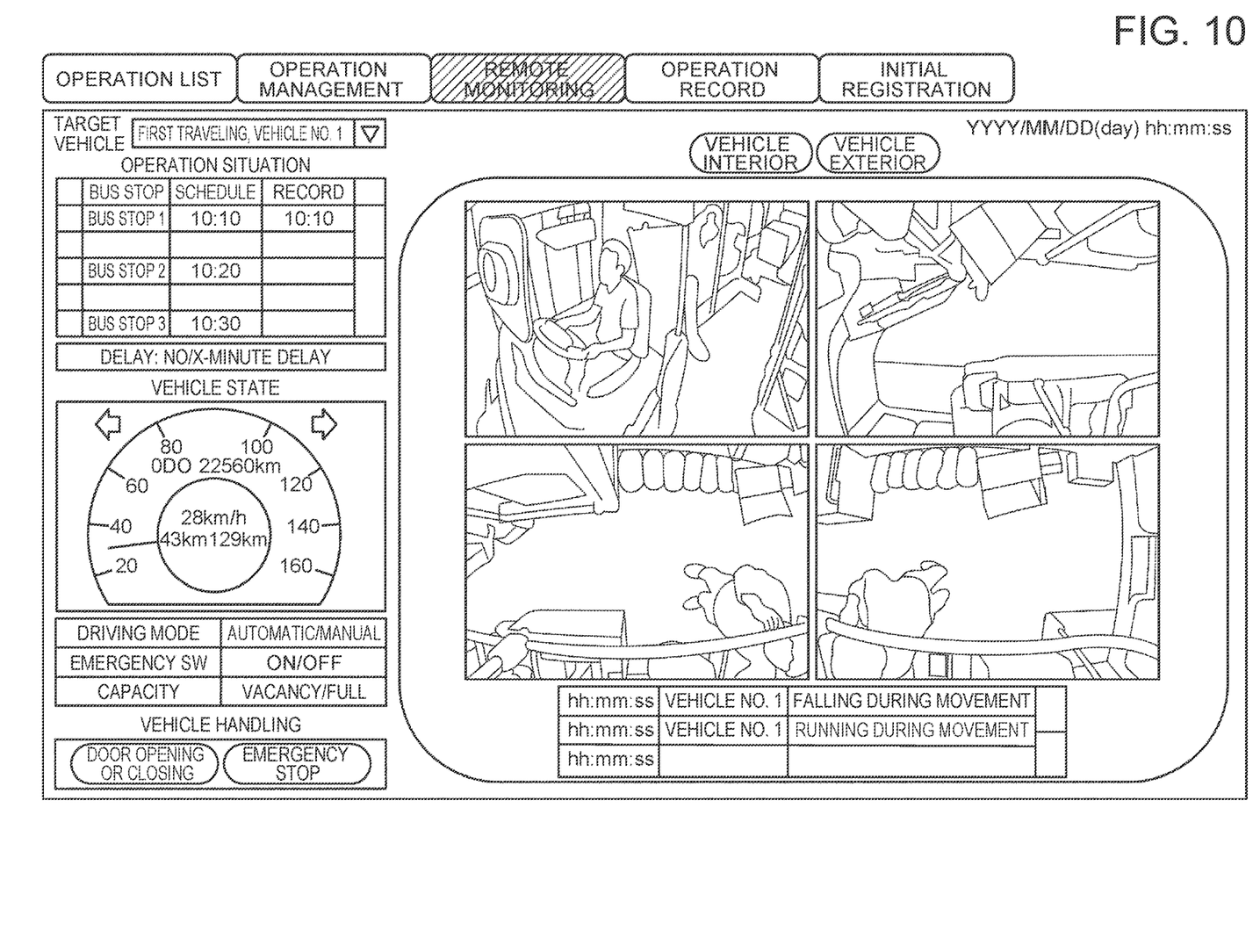
FIG. 10 is a diagram showing an example of an image that is displayed on the display before an inquiry to a remote monitoring person about whether to permit the start of the traveling of the vehicle.

FIG. 10 is a diagram showing an example of an image that is displayed on the display 16 before the inquiry to the remote monitoring person about whether to permit the start of the traveling of the vehicle 3. Before the inquiry to the remote monitoring person, the operation situation (a scheduled time and a record time for each bus stop in this example) of the targeted vehicle 3, the situation (for example, speed) of the vehicle 3, the switching of the driving mode of the vehicle 3, and the handling (door opening or closing, emergency stop and the like) of the vehicle 3 are displayed, and pictures of the vehicle cabin of the vehicle 3 is displayed.

Figure 11:
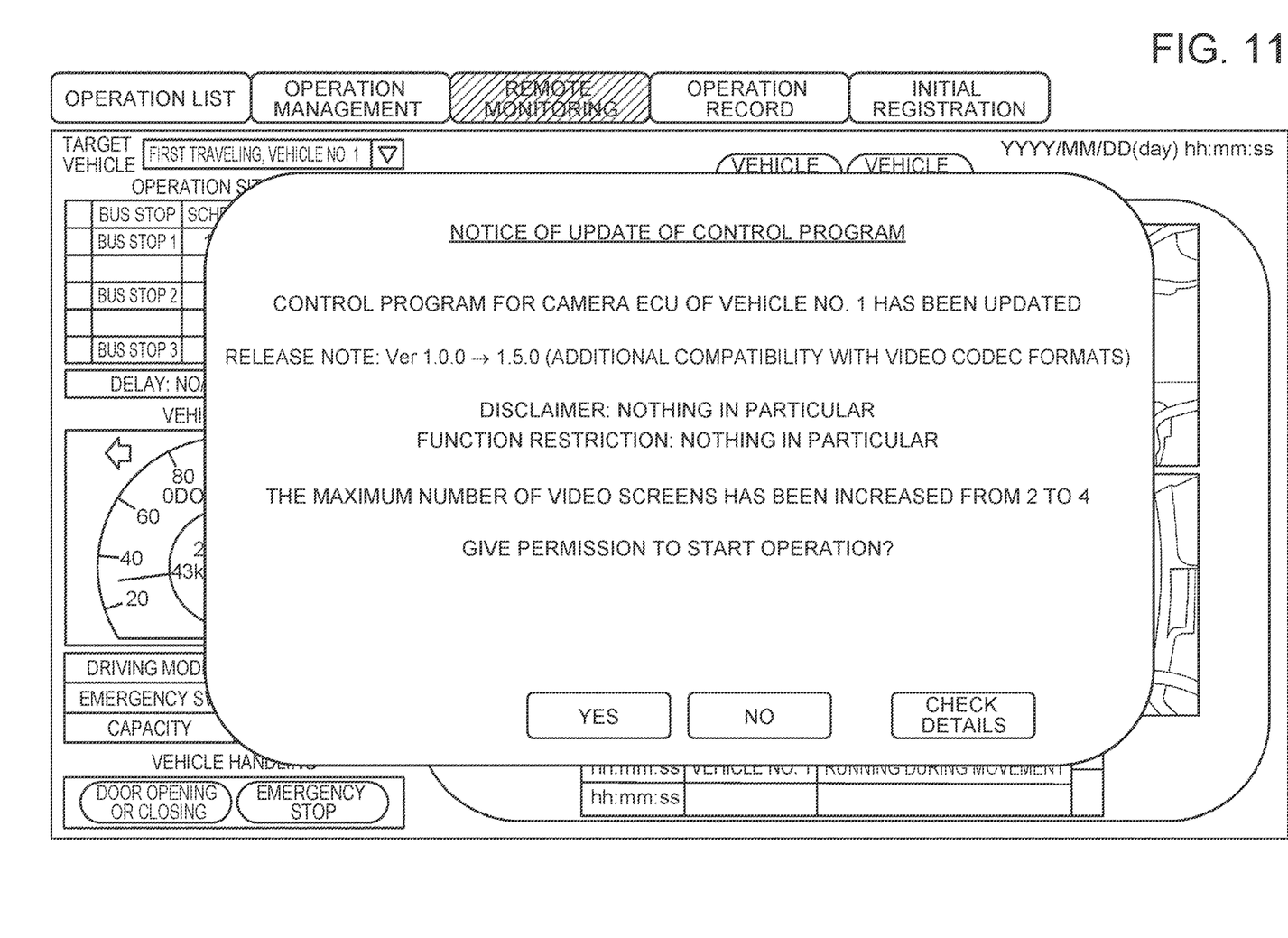
FIG. 11 is a diagram showing an example of an image that is displayed on the display at the time of the inquiry to the remote monitoring person about whether to permit the start of the traveling of the vehicle.

FIG. 11 is a diagram showing an example of an image that is displayed on the display 16 at the time of the inquiry to the remote monitoring person about whether to permit the start of the traveling of the vehicle 3. At the time of the inquiry to the remote monitoring person, a dialog box is displayed on the screen shown in FIG. 10. In the dialog box, for example, information identifying the targeted vehicle 3 (vehicle No. 1 in this example), information identifying the targeted ECU (camera ECU), a brief description (additional compatibility with video codec formats) about the update content of the control program, a disclaimer (nothing in particular) when the updated control program includes a bug, and a function restriction (nothing in particular) due to the update of the control program are displayed.

In addition, in the dialog box, the change content (the maximum number of screens showing the picture photographed by an in-vehicle camera is increased from two to four) of the control program is displayed. It is preferable that the function before the update of the control program and the function after the update of the control program be presented to the remote monitoring person in a comparable manner in this way. Further, it is preferable that information that is used when the remote monitoring person monitors the vehicle 3 be particularly presented to the remote monitoring person.

The server 1 displays the above change content, and then makes the inquiry about whether the remote monitoring person of the vehicle 3 permits the traveling of the vehicle 3 after the update of the control program. In this example, in the case where the remote monitoring person clicks a "YES" button, the traveling of the vehicle 3 is permitted. On the other hand, in the case where the remote monitoring person clicks a "NO" button, the traveling of the vehicle 3 is prohibited. By clicking a "CHECK DETAILS" button, the remote monitoring person can check a more detailed content of the change content before determining the permission or prohibition of the traveling.

Back to FIG. 9, in the case where the remote monitoring person has performed the handling for permitting the start of the traveling of the vehicle 3 (YES in S33), the server 1 gives the notice of the permission of the start of the traveling of the vehicle 3, to the vehicle 3 (S35). When the vehicle 3 receives the notice of the permission of the start of the traveling (YES in S43), the vehicle 3 starts the traveling (S44). For example, the vehicle 3 starts the traveling by activating the control program installed in the flash memory 312C of the ECU 31.

On the other hand, in the case where the remote monitoring person has performed the handling for prohibiting the start of the traveling of the vehicle 3 (NO in S33), the server 1 gives the notice of the prohibition of the start of the traveling of the vehicle 3, to the vehicle 3 (S34). In the case where the vehicle 3 has received the notice of the prohibition of the start of the traveling (NO in S43), the vehicle 3 waits without starting the traveling.

As described above, in the embodiment, in the case where there is an updatable control program for the ECU 31 of the vehicle 3, the control center 2 (or the vehicle 3) makes the inquiry to the server 1 about whether to permit the update of the control program. The server 1 receives the inquiry, and then replies, to the control center 2 (or the vehicle 3), the result (approval or rejection) of the operation manager's handling relevant to whether to permit the update of the control program. Thereby, it is possible to update the control program even when a person having the authority to update the control program does not ride on the vehicle 3. Consequently, with the embodiment, it is possible to appropriately update the control program for the ECU 31 mounted on the vehicle 3.

Furthermore, in the embodiment, after the update of the control program for the ECU 31 of the vehicle 3, the vehicle 3 makes the inquiry to the server 1 about whether to permit the start of the traveling of the vehicle 3, together with the change content (change points of the control, action, function and others of the vehicle 3) of the control program. The server 1 receives the inquiry, and then replies, to the vehicle 3, the result (permission or prohibition) of the remote monitoring person's handling relevant to whether to permit the start of the traveling. Thereby, the remote monitoring person that does not ride on the vehicle 3 can know the change content of the control program before starting the traveling of the vehicle 3. Consequently, with the embodiment, it is possible to appropriately operate the vehicle 3 after the update of the control program.

It should be understood that the embodiment disclosed herein is an example and is not limitative in every respect. It is intended that the scope of the present disclosure is shown not by the above embodiment but by the claims and includes all modifications in meanings and ranges equivalent to the claims.

What is claimed is:

1. A server that monitors an automatic driving vehicle, the automatic driving vehicle being configured to acquire an updatable control program from a control center by wireless communication, the control program being a control program for a control device that is mounted on the automatic driving vehicle, the server comprising:

an input device configured to accept handling by a remote monitoring person that monitors the automatic driving vehicle from outside of the automatic driving vehicle;

an output device configured to present information to the remote monitoring person;

a communication device configured to be capable of communicating with the automatic driving vehicle; and a processor configured to control the input device, the output device and the communication device, wherein when the control program for the automatic driving vehicle is updated, the control center is configured to transmit a notice of an update condition of the control program to the server, wherein when the server receives the update condition of the control program, the processor is configured to control the output device to present a change content of the control program to the remote monitoring person, and wherein when the input device has accepted a remote monitoring person's handling for permitting the automatic driving vehicle to travel in accordance with the control program after the update, the processor is configured to control the communication device to transmit a notice of permission of traveling is given to the automatic driving vehicle.

2. The server according to claim 1, wherein the processor controls the output device such that a function of the automatic driving vehicle before the update of the control program and a function of the automatic driving vehicle after the update of the control program are presented to the remote monitoring person in a comparable manner.

3. The server according to claim 1, wherein the processor controls the output device such that the change content relevant to information that is used when the remote monitoring person monitors the automatic driving vehicle is presented to the remote monitoring person.

4. The server according to claim 1, wherein:

the server manages operation of a plurality of vehicles on each of which a plurality of control devices is mounted; and the change content includes information for identifying a vehicle for which the control program has been updated, from the plurality of vehicles, and includes a condition for identifying a control device for which the control program has been updated, from the plurality of control devices mounted on the vehicle.

5. An information processing system comprising:

a server; and an automatic driving vehicle, wherein the server is configured to monitor the automatic driving vehicle, wherein the automatic driving vehicle being configured to acquire an updatable control program from a control center by wireless communication, the control program being a control program for a control device that is mounted on the automatic driving vehicle, wherein the server comprises:

an input device configured to accept handling by a remote monitoring person that monitors the automatic driving vehicle from outside of the automatic driving vehicle;

an output device configured to present information to the remote monitoring person;

a communication device configured to be capable of communicating with the automatic driving vehicle; and a processor configured to control the input device, the output device and the communication device, wherein when the control program for the automatic driving vehicle is updated, the control center is configured to transmit a notice of an update condition of the control program to the server, wherein when the server receives the update condition of the control program, the processor is configured to control the output device to present a change content of the control program to the remote monitoring person, and wherein when the input device has accepted a remote monitoring person's handling for permitting the automatic driving vehicle to travel in accordance with the control program after the update, the processor is configured to control the communication device to transmit a notice of permission of traveling to the automatic driving vehicle.

6. The information processing system according to claim 5, wherein the automatic driving vehicle starts the traveling after receiving the notice of permission of traveling from the server.

7. An information processing method in which a server monitors an automatic driving vehicle, the automatic driving vehicle being configured to acquire an updatable control program from a control center by wireless communication, the control program being a control program for a control device that is mounted on the automatic driving vehicle, the information processing method comprising:

acquiring, by the server from the control center, a notice of an update condition of the control program;

when the server receives the update condition of the control program, presenting, by the server, a change content of the control program to a remote monitoring person, the remote monitoring person monitoring the automatic driving vehicle from outside of the automatic driving vehicle; and when the input device has accepted a remote monitoring person's handling for permitting the automatic driving vehicle to travel in accordance with the control program after the update, transmitting a notice of permission of traveling to the automatic driving vehicle.

* * * * *